United States Patent [19]

Dhont

[11] Patent Number: 4,592,737
[45] Date of Patent: Jun. 3, 1986

[54] TORQUE SENSING DRIVE

[75] Inventor: André G. J. Dhont, Maldegem, Belgium

[73] Assignee: Sperry Corporation, New Holland, Pa.

[21] Appl. No.: 738,819

[22] Filed: May 23, 1985

Related U.S. Application Data

[63] Continuation-in-part of Ser. No. 391,763, Jun. 24, 1982, abandoned.

[51] Int. Cl.⁴ .......................... F16H 9/18; F16H 11/06
[52] U.S. Cl. ........................................ 474/19; 474/17; 474/50
[58] Field of Search ................. 474/19, 20, 21, 17, 474/12, 50, 70; 74/710.5

[56] References Cited

U.S. PATENT DOCUMENTS

| | | | |
|---|---|---|---|
| 1,883,342 | 10/1932 | Densmore | 464/39 X |
| 2,291,407 | 7/1942 | Paul | 464/39 |
| 2,855,806 | 10/1958 | Fallon | 74/710.5 |
| 2,911,803 | 11/1959 | Weasler | 464/39 |
| 3,279,270 | 10/1966 | Pacak | 474/19 |
| 3,616,706 | 11/1971 | Shimamoto | 474/19 |
| 3,842,637 | 10/1974 | Wilson | 474/19 |
| 3,850,050 | 11/1974 | Lemmens | 474/12 X |
| 3,881,370 | 5/1975 | Vogelaar et al. | 474/19 X |
| 3,884,316 | 5/1975 | Bowers | 474/12 X |
| 3,967,711 | 7/1976 | Stroezel et al. | 464/38 X |
| 4,033,195 | 7/1977 | Takagi et al. | 474/19 |
| 4,173,155 | 11/1979 | Togami et al. | 474/19 |

FOREIGN PATENT DOCUMENTS

| | | |
|---|---|---|
| 1902841 | 9/1964 | Fed. Rep. of Germany . |
| 2629279 | 3/1979 | Fed. Rep. of Germany . |
| 833383 | 4/1960 | United Kingdom . |
| 1105267 | 3/1968 | United Kingdom . |
| 2068483 | 8/1981 | United Kingdom . |

OTHER PUBLICATIONS

ASAE Paper, "Design and Development of a High Horsepower Torque Sensing Variable Speed Drive", Keller and Wilson, 9/11–14/1972.
ASAE Paper, "Design Equations for a Speed and Torque Controlled Variable Ratio V-Belt Transmission", Hornung, Swenson, Shapiro and Oliver, pp. 1–9.

Primary Examiner—Kenneth J. Dorner
Assistant Examiner—Dwight G. Diehl
Attorney, Agent, or Firm—Larry W. Miller; Darrell F. Marquette; Frank A. Seemar

[57] ABSTRACT

A torque sensing variable diameter power transfer assembly is disclosed wherein the cam members are provided with an asymmetrical cam surface pattern having first and second cam surfaces meeting the base of the cam at different angles. The opposing first cam surfaces meet the corresponding base members at approximately 45° and interengage to effectively transmit torque between the opposing cam members during normal operating conditions. The opposing second cam surfaces meet the corresponding case member at approximately 30° and interengage to effectively transmit torque between the respective cam members during reverse power conditions, wherein the normally driven sheave temporarily becomes the drive sheave. The asymmetrical cam surfaces generally eliminate belt slippage during reverse power conditions and permit the engine to brake the power delivered by the normally driven sheave.

6 Claims, 9 Drawing Figures

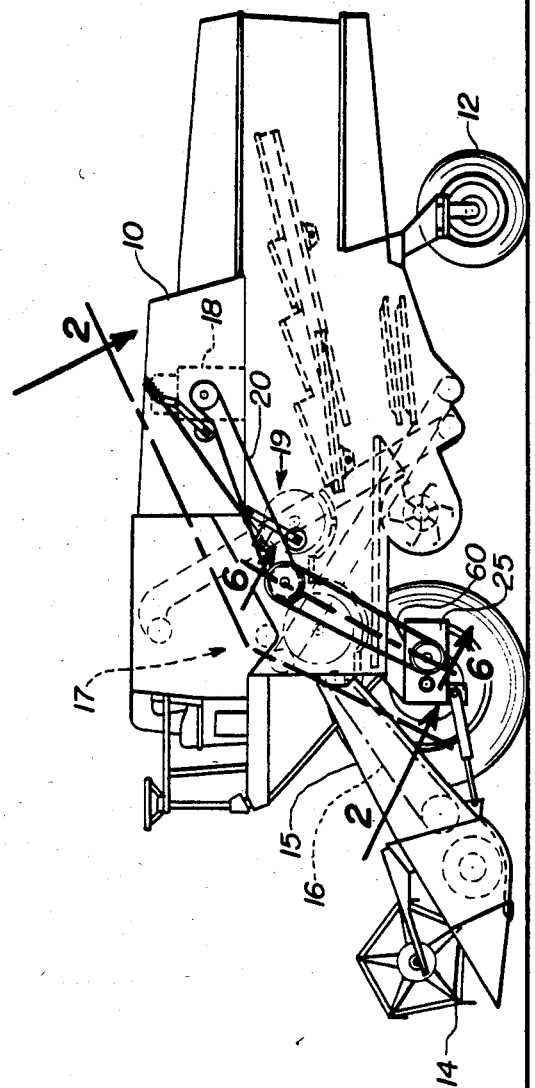
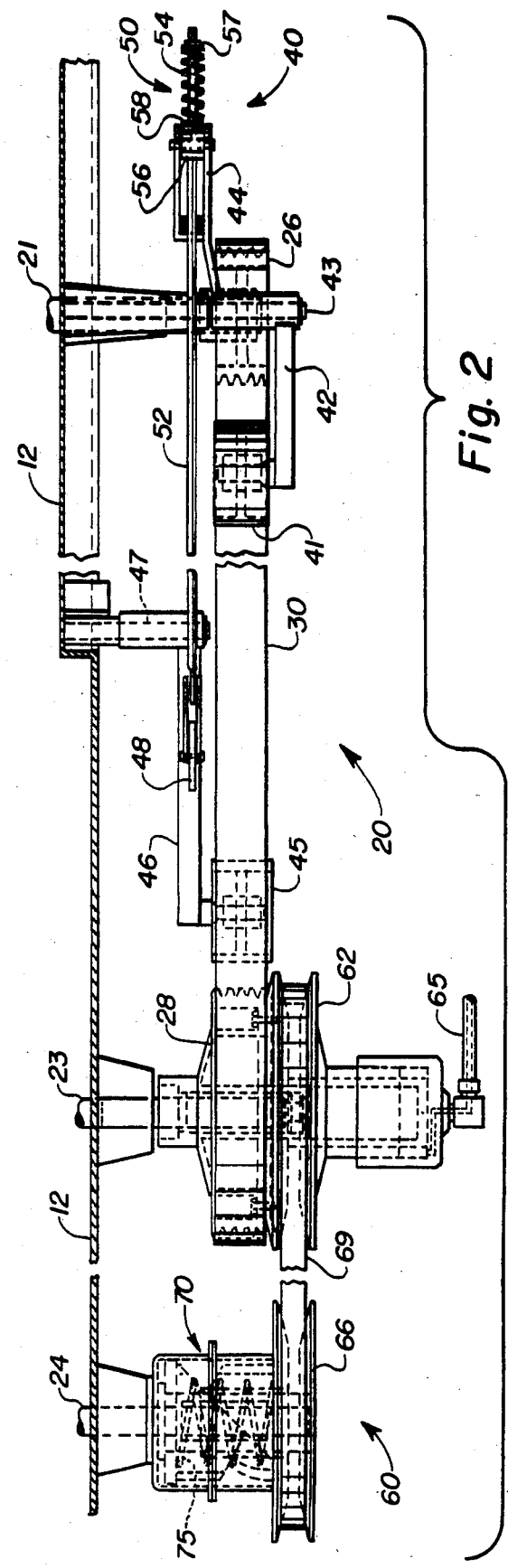
Fig. 1
Fig. 2

TORQUE SENSING DRIVE

CROSS REFERENCE TO RELATED APPLICATION

This application is a continuation-in-part of copending U.S. patent application Ser. No. 391,763 filed June 24, 1982, now abandoned.

BACKGROUND OF THE INVENTION

The present invention relates generally to a variable speed drive for a crop harvesting machine and, more particularly, to an improved cam member for a torque sensing variable diameter power transfer assembly used in a combine harvester drive mechanism.

Torque sensing variable diameter drive mechanisms can be found, for example, in U.S. Pat. No. 3,842,637. Typically, one of the sheave sections is fixed to a power transmitting shaft to be rotatable therewith, while the other sheave section is movably mounted on the shaft to be rotatably and axially movable relative to the fixed sheave section. A first cam member is attached to the fixed sheave section and a second cam member is attached to the movable sheave section, each cam member being rotatable with the respective sheave section. The cam members are mounted so as to be in axially shiftable torque transmitting engagement with each other, while a spring biases them apart. Any rotational movement of the movable sheave section relative to the fixed sheave section due to a requirement of more power per given belt speed results in an axial movement of the movable sheave section to increase torque transmitted through the cams.

To prolong the operating life of the belt, it is desirable to place this torque sensing mechanism on the driven shaft of a power transfer mechanism. However, when a combine is traveling downhill, the power induced by gravity may cause the combine to drive the engine, i.e., the power induced by the driven shaft is greater than the power delivered by the engine's power output shaft. Under these reverse power conditions, the normally driven sheave becomes the drive sheave and the torque sensing mechanism is then effectively located on the drive shaft of the power transfer mechanism.

The use of a symmetrical cam having first and second cam surfaces at the same angle relative to the base of the cam does not provide for a proper torque transmitting property when the combine drive mechanism is operating under the aforementioned reverse power conditions, thereby allowing the belt to slip over the movable sheave section and preventing the engine from acting as a brake.

SUMMARY OF THE INVENTION

It is an object of this invention to overcome the aforementioned disadvantages of the prior art by providing an asymmetrical cam member having first and second cam surfaces at different angles relative to the base in a torque sensing power transfer mechanism.

It is another object of this invention to provide asymmetrical cam surface on the cam members of torque sensing variable diameter power transfer assembly.

It is a feature of this invention that opposing first cam surfaces can engage to optimally transmit torque between opposing cam members during normal operating conditions.

It is another feature of this invention that opposing second cam surfaces can interengage to optimally transmit torque between opposing cam members during reverse power conditions.

It is still another object of this invention to provide a power transfer assembly that prevents belt slippage under reverse power conditions.

It is still another feature of this invention that the power transfer assembly provides a larger axial force for a given torque transmission under reverse power conditions then under normal power conditions.

It is yet another object of this invention to provide a power transfer assembly cooperable with a variable diameter sheave to cause the movable sheave half to exert a larger axial force on the drive belt under reverse power conditions than under normal operating conditions.

It is an advantage of this invention that under reverse power conditions the engine can be permitted to brake the downhill speed of the combine in an effective manner.

It is a further object of this invention to provide torque sensing variable diameter power transfer assembly that is effective in use under both normal operating conditions and reverse power conditions.

These and other objects, features and advantages are accomplished according to the instant invention by providing a torque sensing variable diameter power transfer assembly wherein the cam members are provided with an asymmetrical cam surface pattern having first and second cam surfaces meeting the base of the cam at different angles. The opposing first cam surfaces meet the corresponding base members at approximately 45° and interengage to effectively transmit torque between the opposing cam members during normal operating conditions. The opposing second cam surfaces meet the corresponding base member at approximately 30° and interengage to effectively transmit torque between the respective cam members during reverse power conditions, wherein the normally driven sheave temporarily becomes the drive sheave. The asymmetrical cam surfaces generally eliminate belt slippage during reverse power conditions and permit the engine to brake the power delivered by the normally driven sheave.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a side elevational view of a mobile crop harvesting machine, commonly referred to as a combine, incorporating the principles of the instant invention;

FIG. 2 is an enlarged cross-sectional view taken along lines 2—2 of FIG. 1 to show both the fixed and variable diameter drives, portions of each drive belt being broken away;

FIG. 3 is a diagrammatical view of the fixed diameter belt drive showing the operation of the tensioning apparatus under normal operating conditions;

FIG. 4 is a diagrammatical view of the fixed diameter belt drive showing the operation of the tensioning apparatus under reverse power conditions;

FIG. 5 is a diagrammatical view of the fixed diameter belt drive showing the relative positions of the tensioning members under no load conditions;

Figure 7:
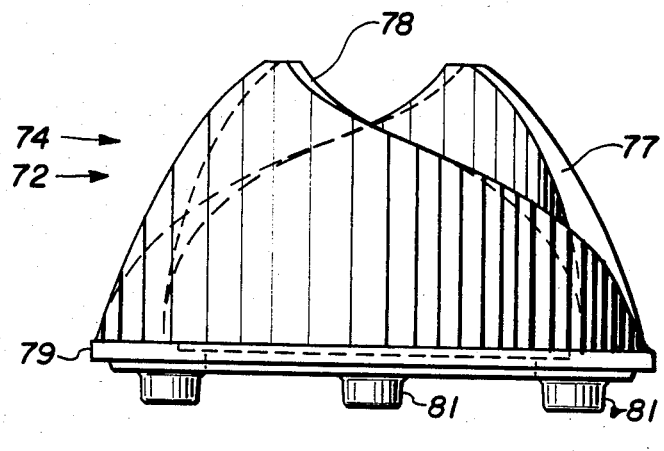
Figure 8:
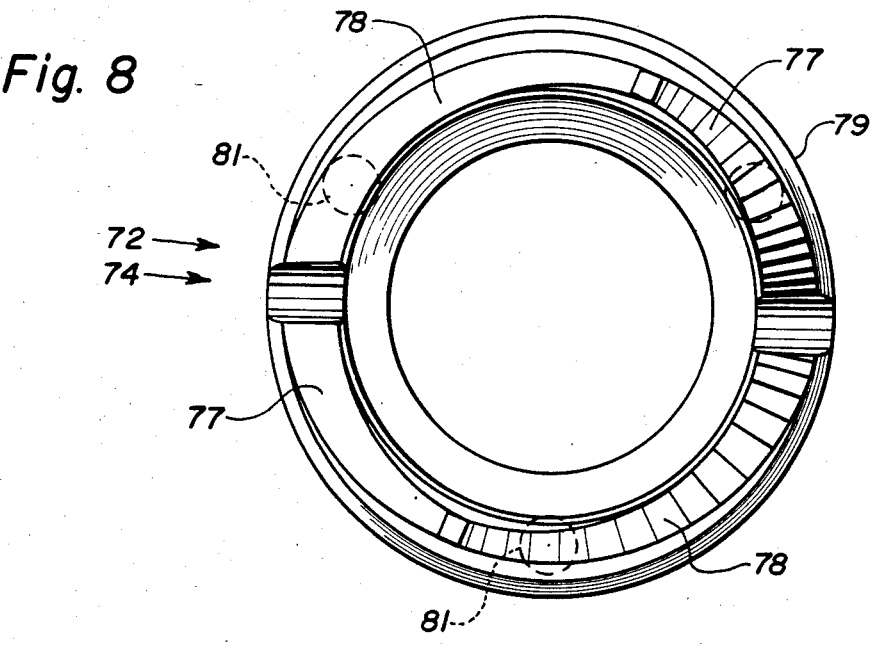

FIG. is an enlarged partial cross-sectional view taken along lines 6—6 of FIG. 1 to show the variable diameter torque sensing power transfer assembly incorporating the principles of the instant invention, the relative position of the drive belt being shown under high speed operation while the relative position of the drive belt under low speed operation is shown in phantom;

FIG. 7 is a side view of a cam member used in the driven sheave assembly of the variable diameter belt drive;

FIG. 8 is a top plan view of the cam member seen in FIG. 7; and

Figure 9:
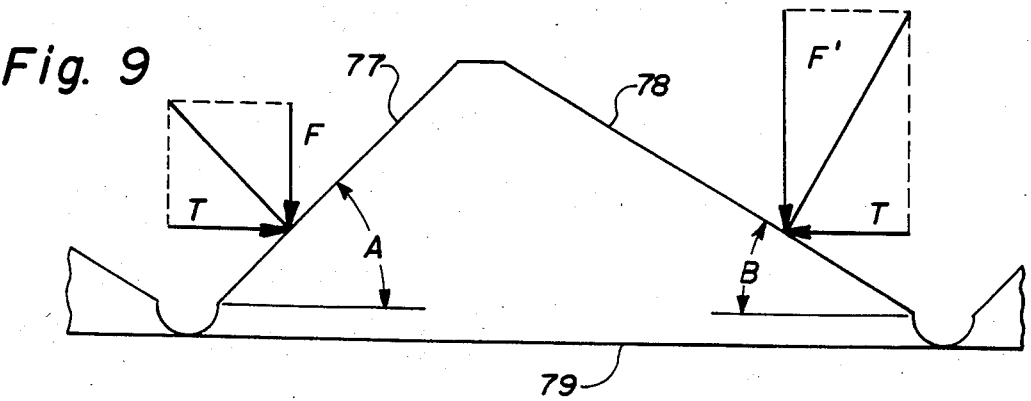

FIG. 9 is a schematic drawing showing the relative positions of the cam surfaces on the cam members seen in FIG. 7.

DETAILED DESCRIPTION OF THE PREFERRED EMBODIMENT

Referring now to the drawings and, particularly, to FIG. 1, a side elevational view of a crop harvesting machine, commonly referred to as a combine, can be seen. The combine base unit 10 includes a wheeled frame 12 onto which is supported a forwardly mounted crop harvester header 14 operable to sever standing crop material and initiate the crop harvesting process. A feeder house 15 interconnects the header 14 and the base unit 10 and houses a conveyor 16 for transferring severed crop material rearwardly from the header 14.

Threshing and cleaning apparatus 17 is suitably housed within the base unit 10 rearwardly of the feeder house 15 to receive the severed crop material therefrom and subsequently separate the edible grain crop from the trash material, as is well known in the art. An engine 18 is supported by the frame 12 and is the source of driving power for operating the various components of the combine, including serving as the prime mover. A power transfer mechanism 19 transfers rotational power from the engine 18 to these driven components.

FIXED DIAMETER BELT DRIVE MECHANISM

Referring now to FIGS. 1 and 2, it can be seen that the power transfer mechanism 19 can include both a fixed diameter belt drive 20 and a variable diameter belt drive 60. In the arrangement depicted in FIGS. 1 and 2, a fixed diameter drive 20 transfers rotational power from the power output shaft 21 of the engine 18 to an intermediate shaft 23, which with respect to the fixed drive 20 is a driven shaft but becomes a drive shaft for the variable drive 60. The rotational power is then transferred from the intermediate shaft 23 to the power input shaft 24 of the combine propulsion unit 25.

The fixed diameter drive 20 is best seen in FIGS. 2-5. A first fixed diameter pulley is affixed to the power output shaft 21 and rotatable therewith. A second fixed diameter pulley 28 is mounted on the intermediate shaft 23 for rotation therewith. An endless flexible belt 30 is entrained around both the first and second pulleys 26,28 to transfer rotational power therebetween.

Figures 3, 4, 5:
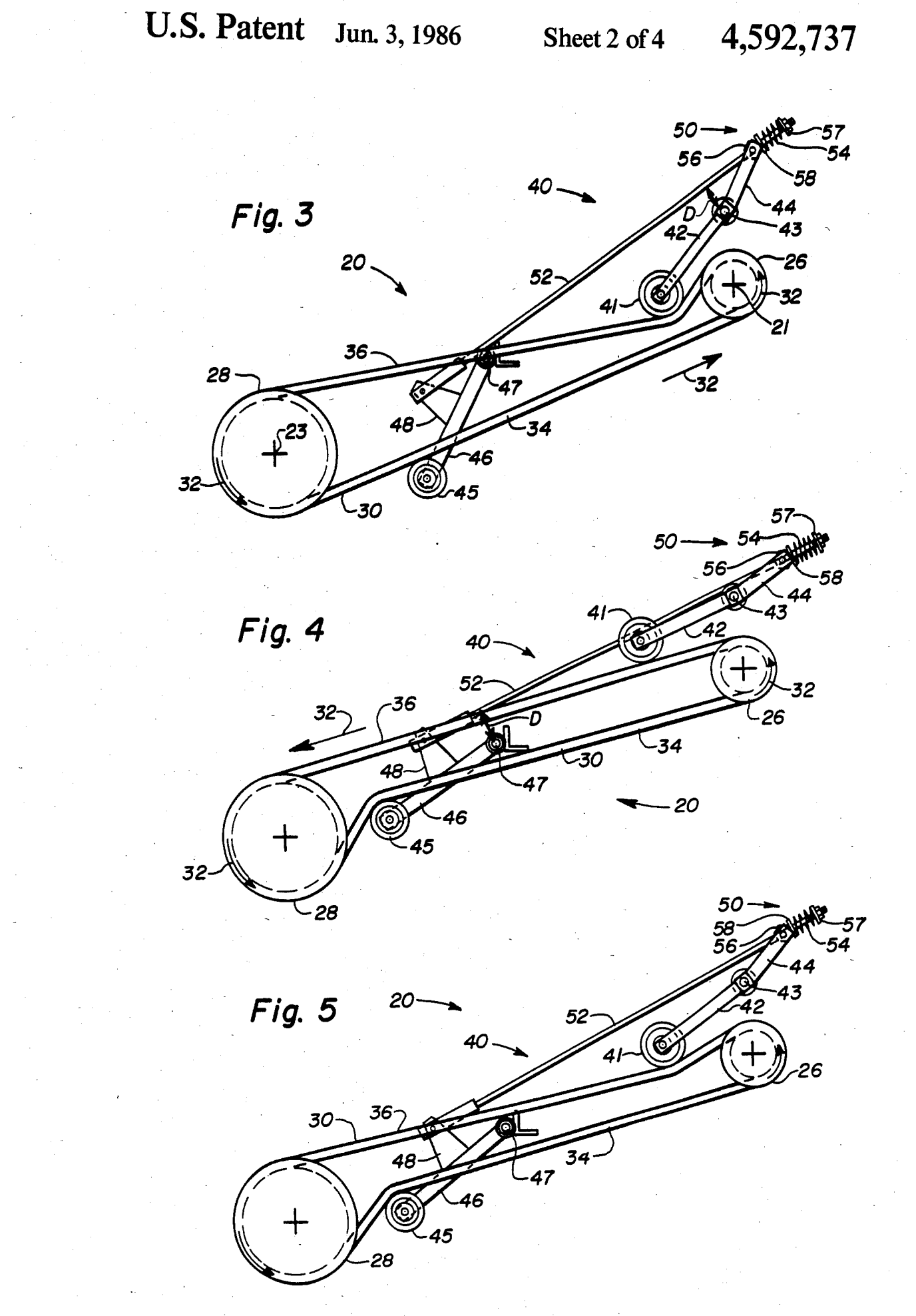

Under normal operating conditions, as seen in FIG. 3, the first pulley 26 drives the second pulley 28 with rotation being in the direction being indicated by the arrows 32. As a result, one side or run 34 of the belt 30 will normally be taut, while the other run 36 will normally be slack. As is well known in the art, the amount of tension in the normally taut run 34 is directly related to the amount of power being transferred between the first and second pulleys 26,28.

To take up the slack in the run 36 of the belt 30, thereby keeping the belt 30 in proper engagement with the pulleys 26,28, a tensioning apparatus 40 is provided. As can be seen in FIGS. 2-5, the tensioning apparatus 40 includes a first tensioning pulley 41 engageable with the normally slack run 36 and a second tensioning pulley 45 engageable with the normally taut run 34. The first tensioning pulley 41 is rotatably supported on a support arm 42 pivotally mounted at pivot 43 to the frame 12. A pivot arm 44 is affixed to the support arm 42 and is also pivotally movable about the pivot 43 in a fixed relationship to the support arm 42. Likewise, the second tensioning pulley is rotatably supported on a support arm 46 pivotally mounted at pivot 47 to the frame 12. A second pivot arm 48 is affixed to the second support arm 46 at a location spaced from the second pivot 47.

A biasing mechanism 50 provides a biasing force to keep the tensioning pulleys 41,45 in engagement with the respective run 34,36 of the belt 30. The biasing mechanism 50 includes an elongated rod 52 pivotally interconnecting the first and second pivot arms 44,48 and a biasing spring 54. As is best seen in FIG. 2, the first pivot arm 44 is pivotally connected to a tubular slide member 56 concentrically mounted on the elongated rod 52 adjacent the spring 54. The spring 54 is compressed to exert a biasing force between a stop 57, in the form of a washer and nut threaded onto the end of the elongated rod 52, and a retaining bracket 58 slidably mounted on the elongated rod 52 to be engageable with the slide member 56.

The biasing force exerted by the spring 54 against the first pivot arm 44 slidably and pivotally mounted on the elongated rod 52 via the slide member 56 urges the first tensioning pulley 41 into engagement with the normally slack run of the belt 30. The opposing biasing force of the spring 54 against the stop 57 urges the second tensioning pulley 45 into engagement with the normally taut run 34 of the belt 30. Because the biasing force exerted by the spring 54 is exerted along the axis of the elongated rod 52 through the pivot arms 44,48 at a point spaced from the respective pivots 43,47, the amount of tensioning force exerted by the tensioning pulleys 41,45 on the belt 30 is a function of the distance D between the axis of the elongated rod 52 and the respective pivot 43,47.

Under normal operating conditions as seen in FIG. 3, the spring 54 exerts an equal biasing force on the pivot arms 44,48; however, the amount of tensioning force exerted by the second tensioning pulley 45 on the normally taut run 34 of the belt 30 is minimal, approaching zero, because the distance between the axis of the elongated rod 52 and the second pivot 47 is substantially zero. On the other hand, the tensioning force exerted by the first tensioning pulley 41 on the normally slack run 36 is sufficient to take up the slack in the normally slack run 36 because of the significantly larger moment arm D between the elongated rod 52 and the first pivot 43. The lack of significant tensioning force exerted by the second tensioning pulley 45 on the normally taut run 34 permits the belt to have a longer working life than if a greater tensioning force were exerted thereon.

Under reverse power conditions, as will occur under certain circumstances, such as the combine going downhill, the normally driven pulley becomes the drive pulley and attempts to transfer rotational power to the normally driven pulley, i.e., the combine drives the engine. Under these reverse power conditions, the normally slack run 36 of the belt 30 becomes taut and, consequently, the normally taut run 34 becomes slack. To maintain proper driving contact between the belt 30 and the pulleys 41,45 and, thereby, permit the engine to break the driving power from the combine, it is desirable to take up the slack that would occur in the normally taut run 34 under these conditions.

The inducement of tension into the normally slack run 36 will tighten the run 36 and move it into the position seen in FIG. 4. The movement of the belt 30 into this position causes the first tensioning pulley 41 to move upwardly into the position seen in FIG. 4, thereby causing a corresponding rotation of the pivot arm 44 about the first pivot 43. This movement of the first tensioning pulley 41 causes the elongated rod 52 to move in a generally rearward direction because of the spatial relationship between the pivot arm 44 and the support arm 42. This movement of the elongated rod 52 effects a corresponding rotation of the second support arm about the pivot 47 to move the second tensioning pulley 45 and take up the slack temporarily induced into the normally taut run 34.

Because of the spatial relationships between the various components of the tensioning apparatus 40, the movement of the elongated rod 52 during the transition from the normal operating condition to the reverse power condition effects a reduction of the distance D between the axis of the elongated rod 52 and the first pivot 43 while increasing the moment arm D between the elongated rod 52 and the second pivot 47. As a result, when the fixed diameter power transfer mechanism 20 is in the reverse power condition, as seen in FIG. 4, the tensioning force exerted by the first tensioning pulley on the now taut run 36 of the belt 30 is minimal, approaching zero, while the tensioning force exerted by the second tensioning pulley 45 is sufficient to take up the slack induced in the run 34. The relative positions of the components of the tensioning apparatus 40 during the transition between the normal operating condition and the reverse power condition can be seen in FIG. 5, which also indicates the relative position of these components during a no load condition.

As one skilled in the art will readily realize, the tensioning apparatus 40 provides a mechanism to take up the slack in the drive belt 30 of a fixed diameter drive mechanism 20 in either run 34,36 of the belt 30 in automatic response to the tension induced in the respective run 34,36 of the belt 30. Furthermore, one skilled in the art will readily realize that the tensioning apparatus 46 minimizes the tensioning forces exerted on the taut run of the drive belt 30 to provide an increased working life thereof, irrespective of which run 34,36 of the belt 30 is taut.

VARIABLE DIAMETER BELT DRIVE MECHANISM

Figure 6:
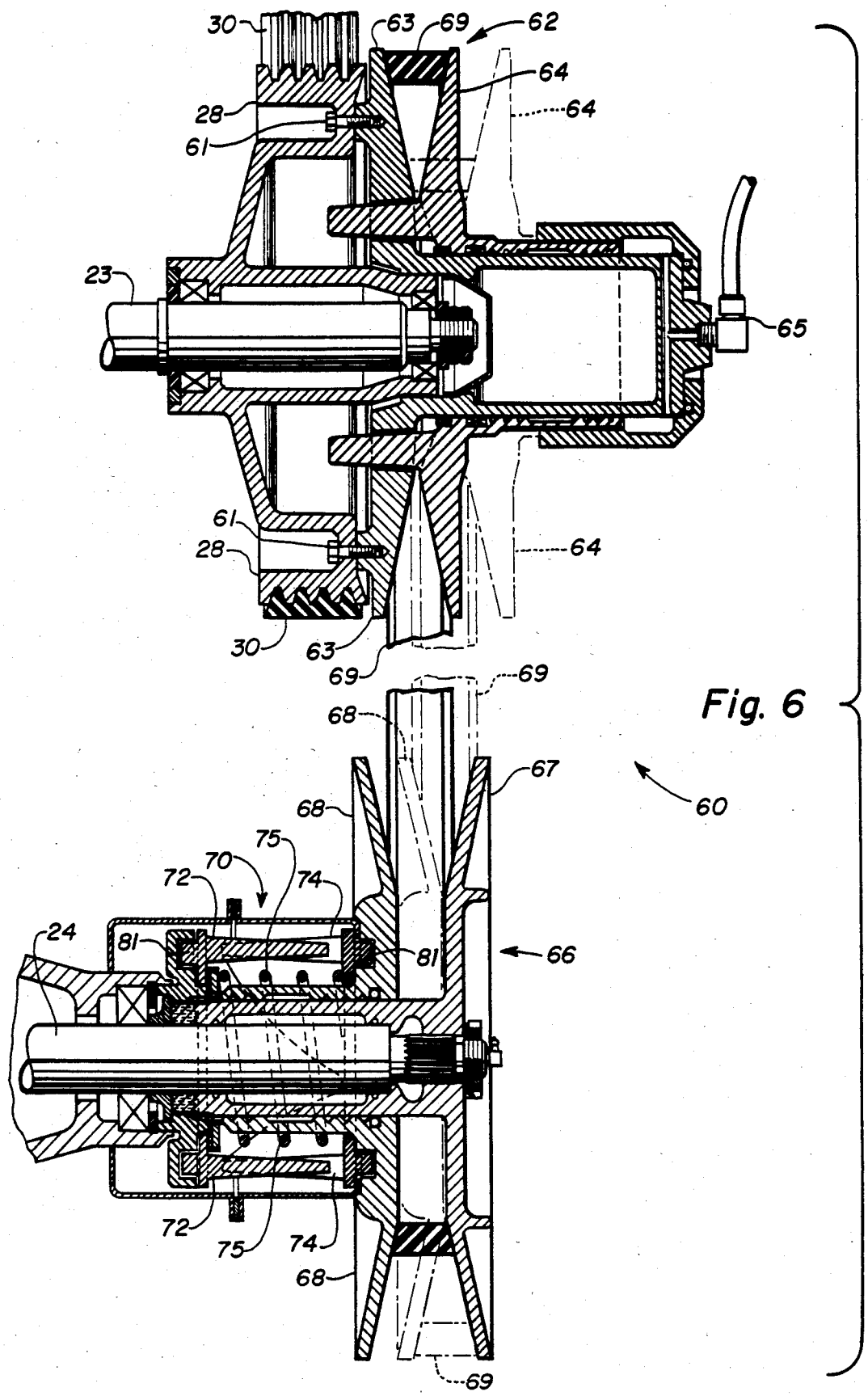

Referring now to FIGS. 1, 2 and 6, a torque sensing variable diameter belt drive mechanism 60 can be seen. A first variable diameter sheave 62 having a fixed sheave half 63 fixedly mounted on the shaft 23 to the second pulley 28 by fastening means, such as screws 61, and rotatable therewith and a movable sheave half 64 mounted on the shaft 23 for rotation with the fixed half 63 but movable along the axis of the shaft 23 relative thereto. A hydraulic control mechanism 65 enables the movable sheave half 64 to be axially selectively positionable relative to the fixed half 63 to change the distance between the fixed half 63 and the movable half 64 and, thereby change the effective diameter of the first variable diameter sheave 62 between a high speed position seen in solid lines and a low speed position seen in phantom.

A second variable diameter sheave 66 is mounted on the power input shaft 24 and includes a fixed sheave half 67 mounted on the shaft 24 for rotation therewith and a movable sheave half 68. As is known in the art, the movable sheave half 68 of the driven sheave 66 in a torque sensing variable diameter drive is free to move both axially and rotatably relative to the fixed sheave half 67. The fixed sheave half 67 normally drives the movable sheave half 68 through a torque sensing mechanism 70 so as to be rotatable therewith as a unitary sheave assembly 66. An endless flexible belt 69 is entrained between the first and second variable diameter sheaves 62,66 to transfer rotational power therebetween.

The torque sensing mechanism 70 includes a first cam member 72, seen in FIGS. 6–8, connected to the fixed sheave half 67 and rotatable therewith. A second cam member 74 is connected to the movable sheave half 68 for rotation therewith. A spring 75 concentrically mounted on the power input shaft 24 urges the first and second cam members 72,74 apart, thereby urging the movable sheave half 68 toward the first sheave half 67. As can be seen in FIGS. 6–8, each cam member 72,74 includes a pair of first cam surfaces 77, a pair of second cam surfaces 78 and a base member 79 having tabs 81 engageable with corresponding indentations in the respective sheave halves 67,68 to effect rotation of the respective cam member 72,74 therewith.

Under the aforesaid normal operating conditions, corresponding first cam surfaces 77 on the first and second cam members 72,74 are engaged to cause the movable sheave half 68 to rotate with the fixed sheave half 67. Any rotational movement of the movable sheave half 68 relative to the fixed sheave half 67, due to a change in the power requirement for the power input shaft 24, as is known in the art, causes the corresponding first cam surfaces 77 to slide over each other and effect an axial movement of the movable sheave half 68 relative to the fixed sheave half 67 which, in turn, causes a change in the tension in the endless flexible belt 69.

Under the aforesaid reverse power conditions, the torque sensing mechanism 70 finds itself as being mounted on the drive shaft, rather than the driven shaft and, accordingly, the torque sensing characteristics are different. To provide proper tensioning in the belt 69 under the aforesaid reverse power conditions, each cam member 72,74 is provided with an asymmetrical second cam surface 78 which interengage, because the fixed sheave half 67 is now driving the movable sheave half 68, to cause the movable sheave half 68 and the fixed sheave 67 to rotate as a unitary sheave assembly 66. The asymmetrical second cam surface 78 provides a different amount of axial movement of the movable sheave half 68 per given increment of rotation thereof relative to the fixed sheave half 67 than the first cam surface 77 to provide the proper torque sensing properties under the reverse power conditions.

The transmission of torque through the belt 69 under reverse power conditions requires a greater axial force than under normal power conditions because of the effective positioning of the torque sensing mechanism 70 on the driven side of the power transfer assembly, rather than on the driven side. In other words, the movable sheave half 68 must be caused to exert a larger axial force on the drive belt 69 when operating under reverse power conditions. As can be seen in FIG. 9, for a given tangential force T acting between the cam surfaces 77,78, the axial force F corresponding to the first cam surface 77 is less than the axial force F' corresponding to the second cam surface 78 because the angle B is less than the angle A.

Since the pressure angle B of the second cam surface 78, which is operative under reverse power conditions, is smaller than the pressure angle A of the first cam surface 77, which is operative under normal operating conditions, the cam members 72,74 are provided with an asymmetrical cam surface pattern that allows the transmission of the full power range with a constant tension ratio, i.e., the ratio of the tension between the driving and driven strands of the belt 69, irrespective of whether the power transfer assembly is effectively positioned on the driving or driven side. Accordingly, the flow of energy is fully maintained under all operating conditions.

The flat pattern layout of the asymmetrical first and second cam surfaces 77,78 can be schematically seen in FIG. 9. In the preferred embodiment described above, it has been found that angle A, the angle between the first cam surface 77 and the base member 79 should be approximately 45°, while angle B, the angle between the second cam surface 78 and the base member 79, should be approximately 30°, to give good results under both normal operating conditions and reverse power conditions.

It will be understood that various changes in the details, materials, steps and arrangements of parts which have been described and illustrated to explain the nature of the invention, will occur to and may be made by those skilled in the art upon a reading of the disclosure within the principles and scope of the invention. The foregoing description illustrates preferred embodiments of the invention. However, concepts, as based on such a description, may be employed in other embodiments without departing from the scope of the invention. Accordingly, the following claims are intended to protect the invention broadly, as well as in the specific form shown herein.

Having thus described the invention, what is claimed is:

1. In a torque sensing variable diameter power transfer assembly having a fixed sheave half connected to a power transmitting shaft and rotatable therewith; a movable sheave half co-axially mounted on said power transmitting shaft and slidably movable along the axis of said shaft relative to said fixed sheave half; a first cam member co-axially mounted on said power transmitting shaft and rotatable with said movable sheave half, a second cam member co-axially mounted on said power transmitting shaft and rotatable with said movable sheave half, said first cam member being in axially shiftable torque transmitting engagement with said second cam member, each said cam member having a cam surface engageable with the cam surface on the other of said cam members to transmit torque therebetween; and spring means mounted between said first and second cam members to axially urge said cam members away from one another, the improvement comprising:

an asymmetrical cam surface pattern on each of said cam members, each said cam member having a first cam surface and an opposing second cam surface, the corresponding said first cam surfaces engaging under conditions where said second cam member is transmitting torque to said first cam member, the corresponding said second cam surfaces engaging under conditions where said first cam member is transmitting torque to said second cam member, said first and second cam surfaces providing different amounts of axial movement per given amount of relative rotational movement therebetween, said cam members exerting a greater axial force for a given tangential force on said cam surfaces when said second cam surfaces are engaged than when said first cam surfaces are engaged, permitting the transmission of a full range of power through said power transfer assembly with a constant tension ratio in a drive member drivingly engaged with said fixed and movable sheave halves irrespective of which cam member is transmitting torque to the other said cam member.

2. The power transfer assembly of claim 1 wherein said first and second cam members are operable to transfer the same torque therebetween irrespective of which cam member is transmitting the torque to the other said cam member.

3. The power transfer assembly of claim 2 wherein said second cam surfaces have a smaller pressure angle than said first cam surfaces.

4. The power transfer assembly of claim 3 wherein said first cam surface rises from the base of each respective cam member at a pressure angle of approximately 45°.

5. The power transfer assembly of claim 4 wherein said second cam surface meets the base of each respective cam member at a pressure angle of approximately 30°.

6. The power transfer assembly of claim 5 wherein each said cam member includes a pair of first cam surfaces and a pair of second cam surfaces.

* * * * *